(12) United States Patent
Kotvis

(10) Patent No.: US 12,235,803 B1
(45) Date of Patent: Feb. 25, 2025

(54) VECTOR EMBEDDING COMPRESSION

(71) Applicant: Insight Direct USA, Inc., Chandler, AZ (US)

(72) Inventor: Benjamin Kotvis, Sussex, WI (US)

(73) Assignee: Insight Direct USA, Inc., Chandler, AZ (US)

( * ) Notice: Subject to any disclaimer, the term of this patent is extended or adjusted under 35 U.S.C. 154(b) by 0 days.

(21) Appl. No.: 18/631,541

(22) Filed: Apr. 10, 2024

(51) Int. Cl.
| | |
|---|---|
| G06F 16/00 | (2019.01) |
| G06F 16/174 | (2019.01) |
| G06F 16/22 | (2019.01) |
| G06F 16/2458 | (2019.01) |

(52) U.S. Cl.
CPC ...... *G06F 16/1744* (2019.01); *G06F 16/2237* (2019.01); *G06F 16/2477* (2019.01)

(58) Field of Classification Search
None
See application file for complete search history.

(56) References Cited

U.S. PATENT DOCUMENTS

| | | | |
|---|---|---|---|
| 4,849,810 | A | 7/1989 | Ericsson |
| 7,246,314 | B2 | 7/2007 | Foote et al. |
| 8,362,931 | B2 | 1/2013 | Hunt et al. |
| 8,369,407 | B2 | 2/2013 | Saoudi et al. |
| 8,768,899 | B2 | 7/2014 | Faerber et al. |
| 11,222,055 | B2 | 1/2022 | Frison |
| 11,500,842 | B2 | 11/2022 | Bao et al. |
| 11,620,270 | B2 * | 4/2023 | Kambhammettu ......... G06F 16/2358 707/741 |
| 11,663,289 | B1 | 5/2023 | Batruni |
| 2011/0216829 | A1 | 9/2011 | Raveendran |
| 2023/0274135 | A1 | 8/2023 | Li et al. |
| 2023/0334022 | A1 * | 10/2023 | Goodwin ............... H04L 69/04 |

FOREIGN PATENT DOCUMENTS

| | | |
|---|---|---|
| CN | 114168588 A | 3/2022 |
| JP | S62192869 A | 8/1987 |
| WO | 2022238277 A1 | 11/2022 |
| WO | 2023218232 A1 | 11/2023 |

\* cited by examiner

*Primary Examiner* — Anhtai V Tran
(74) *Attorney, Agent, or Firm* — Kinney & Lange, P.A.

(57) ABSTRACT

A method of database operations includes receiving a user query, generating a query vector embedding representative of the user query, querying a vector database using the query vector embedding, retrieving a first database vector of the plurality of database vectors based on the query and representative of a first data file corresponding to a first time and belonging to a first time-series data set, receiving a first plurality of delta encodings describing differences between vector representations of temporally-adjacent data files of the first time-series data set, identifying a second data file of the first time-series data set having a second vector representation that differs from the first database vector and corresponds to a second time, and retrieving the second data file from a database.

20 Claims, 9 Drawing Sheets

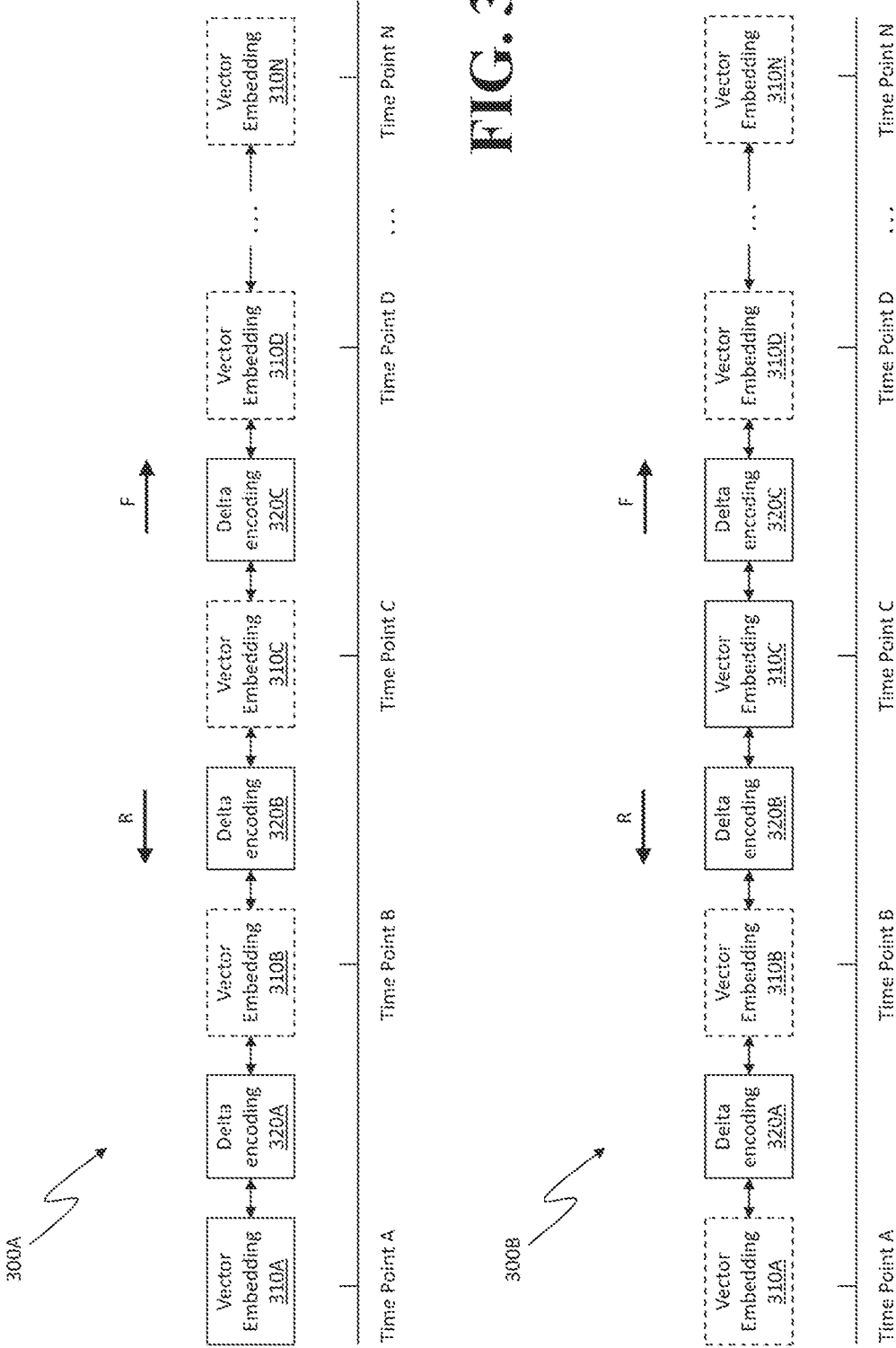

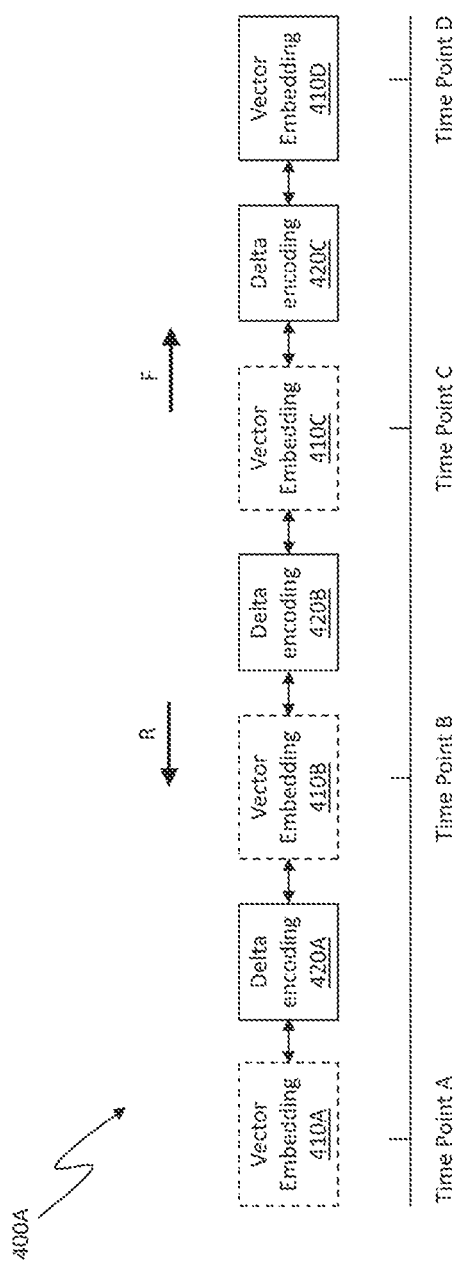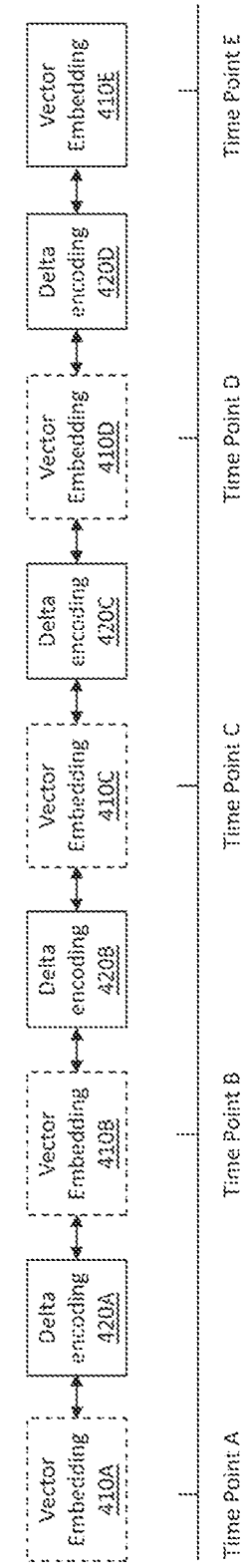
FIG. 4A
FIG. 4B

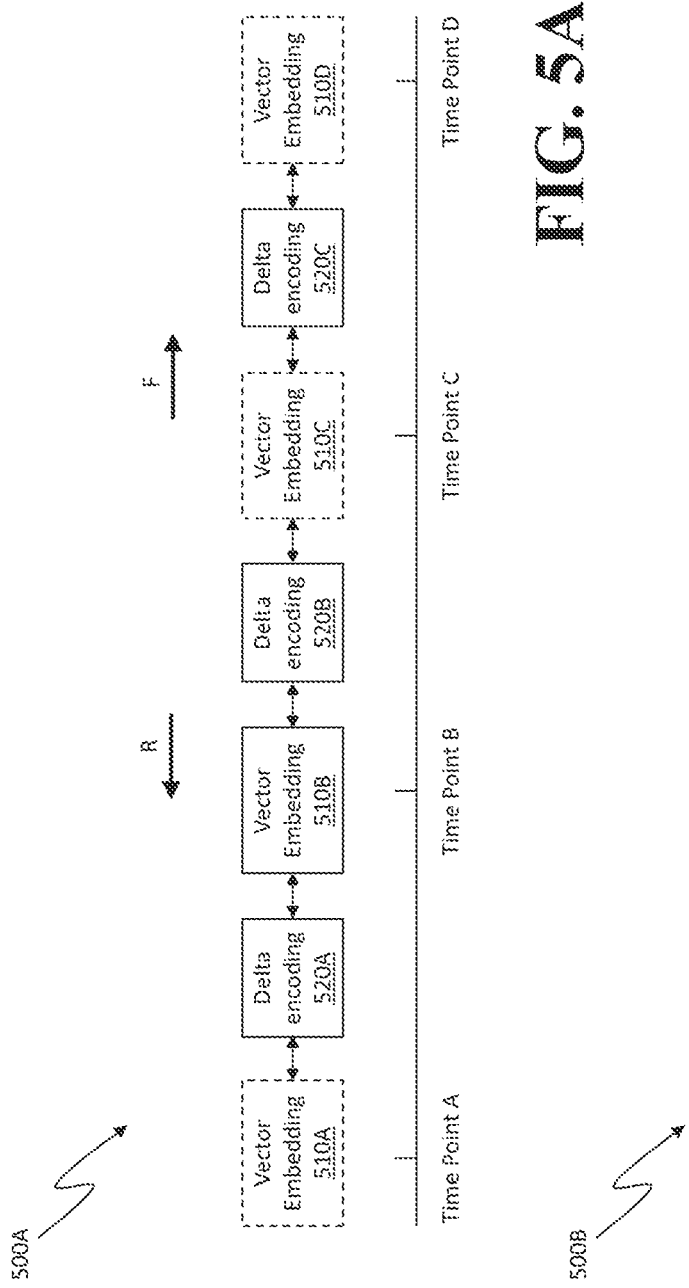
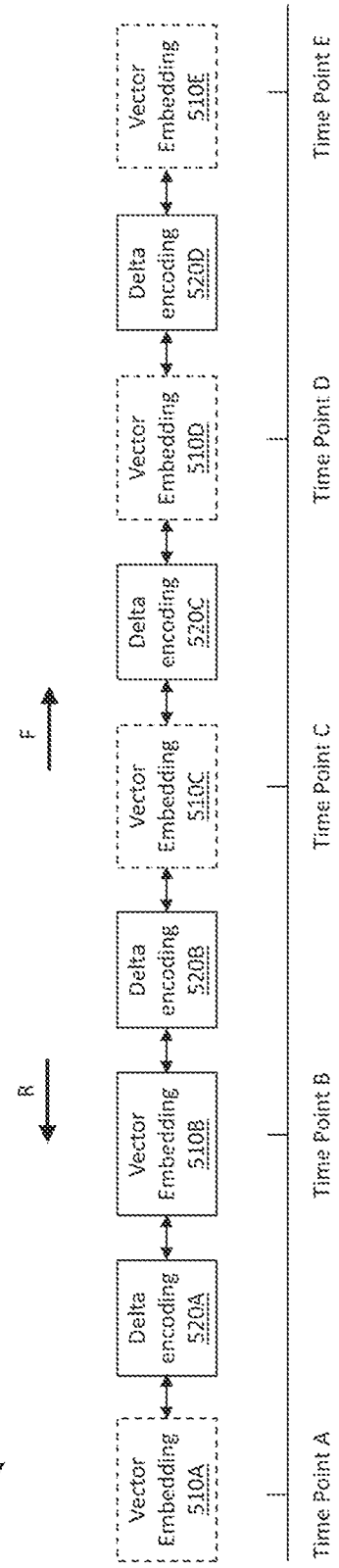
FIG. 5A
FIG. 5B

VECTOR EMBEDDING COMPRESSION

FIELD OF THE INVENTION

The present disclosure relates to vector embeddings, more particularly, systems and methods for compressing, decompressing, and enabling search of vector embeddings representative of data files of time-series data sets.

BACKGROUND

Vector embeddings can be used to represent a wide range of data and can be constructed to capture relevant aspects, features, etc. of that data. Vector embeddings represent data as arrays of real numbers. The length of the array as well as the meaning of each dimensional value within the array are generally fixed and can be selected to identify particular relationships within data, to enable analysis of those relationships, or otherwise represent relevant aspects of the embedded data. Vector embeddings can be created using a wide range of algorithms and are sometimes created using neural networks.

SUMMARY

An example of a method of database operations includes receiving a user query, generating a query vector embedding representative of the user query, querying a vector database using the query vector embedding, retrieving a first database vector of the plurality of database vectors based on the query, receiving a first plurality of delta encodings describing differences between vector representations of temporally-adjacent data files of a first time-series data set, identifying a second data file of the first time-series data set having a second vector representation that differs from the first database vector, and retrieving the second data file of the time-series data set from a database. The vector database comprises a plurality of database vectors representative of a plurality of data files, each database vector is representative of one data file of the plurality of data files, each data file of the plurality of data files belongs to one time-series data set of a plurality of time-series data sets, and each data file of the plurality of data files corresponds to a first time. The first database vector is representative of a first data file belonging to the first time-series data set of the plurality of time-series data sets. The second data file is identified based on the first plurality of delta encodings and corresponds to a second time.

A system for performing database operations includes a vector database comprising a plurality of database vectors representative of a plurality of data files, a file database organizing a plurality of files, a processor, and at least one memory. Each database vector of the vector database is representative of one data file of the plurality of data files, each data file of the plurality of data files belongs to one time-series data set of a plurality of time-series data sets, and each data file of the plurality of data files corresponds to a first time. The at least one memory is encoded with instructions that, when executed, cause the processor receive a user query, generate a query vector embedding representative of the user query, query the vector database using the query vector embedding, retrieve a first database vector of the plurality of database vectors based on the query, receive a first plurality of delta encodings describing differences between vector representations of temporally-adjacent data files of a first time-series data set, identify a second data file of the first time-series data set having a second vector representation that differs from the first database vector, and retrieve the second data file of the first time-series data set from the file database. The first database vector is representative of a first data file belonging to the first time-series data set of the plurality of time-series data set. The second data file is identified based on the first plurality of delta encodings and corresponds to a second time.

The present summary is provided only by way of example, and not limitation. Other aspects of the present disclosure will be appreciated in view of the entirety of the present disclosure, including the entire text, claims, and accompanying figures.

BRIEF DESCRIPTION OF THE DRAWINGS

FIG. 3A is a schematic diagram of an example of compressed vector data.

FIG. 3B is a schematic diagram of the example of compressed vector data of FIG. 3A following decompression.

FIG. 4A is a schematic diagram of another example of compressed vector data.

FIG. 4B is a schematic diagram of the example of compressed vector data of FIG. 4A after additional vector embedding data is created and compressed.

FIG. 5A is a schematic diagram of yet a further example of compressed vector data.

FIG. 5B is a schematic diagram of the example of compressed vector data of FIG. 5A following decompression.

Figure 1:
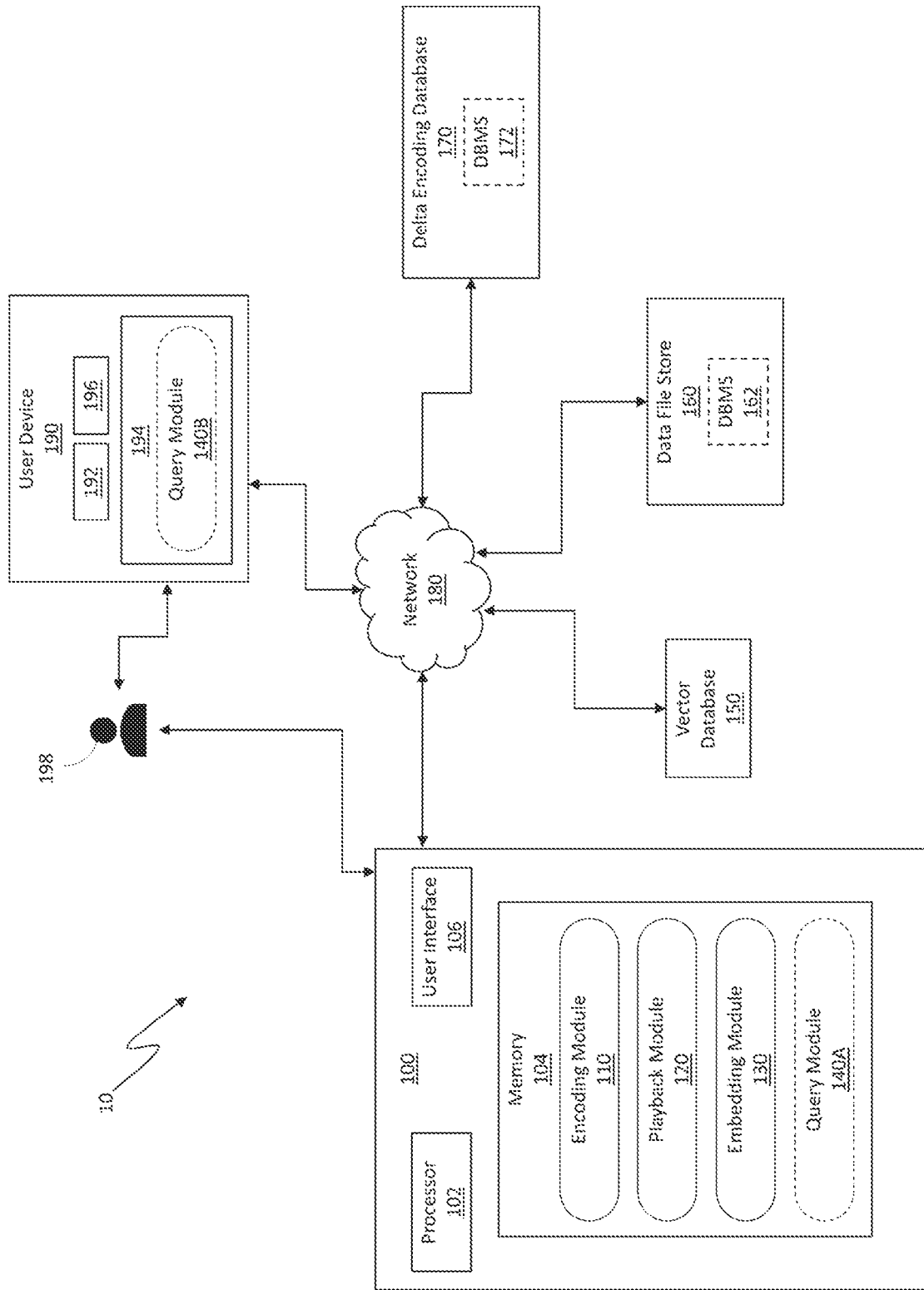
FIG. 1 is a schematic diagram of an example of a system for generating and using compressed vector embedding data.

While the above-identified figures set forth one or more examples of the present disclosure, other examples are also contemplated, as noted in the discussion. In all cases, this disclosure presents the invention by way of representation and not limitation. It should be understood that numerous other modifications and examples can be devised by those skilled in the art, which fall within the scope and spirit of the principles of the invention. The figures may not be drawn to scale, and applications and examples of the present invention may include features and components not specifically shown in the drawings.

DETAILED DESCRIPTION

The present disclosure relates to systems and methods for generating and using compressed vector data. In particular, the present disclosure relates to systems and methods of compressing vector embeddings representative of data files of time-series data sets, of decompressing compressed vector data, and of using compressed vector data to identifying time points at which time-series data sets change (i.e., at which a data file differs from an immediately-preceding data file in a time series). Known temporal adjacency according to a time series is used to compress and decompress vector data, as will be explained in more detail subsequently. The vector database compression detailed herein significantly reduces the storage size needed to maintain vector embeddings representative of time-series data.

FIG. 1 is a schematic depiction of system 10, which is a system for compressing and decompressing vector data, as well as for performing various searches of compressed vector data. System 10 includes server 100, vector database 150, data file store 160, delta encoding database 170, network 180, and user device 190. Server 100 includes processor 102, memory 104, and user interface 106. Memory 104 stores encoding module 110, playback module 120, and embedding module 130, and optionally stores query module 140A. Data file store 160 optionally includes database management system (DBMS) 162 and delta encoding database 170 optionally includes DBMS 172. User device 190 includes processor 192, memory 194, and user interface 196, and memory 194 optionally stores query module 140B. FIG. 1 also depicts user 198.

Server 100 is configured to compress vector data by generating delta encodings, as will be explained in more detail subsequently. The delta encodings generated by server 100 can be stored to delta encoding database 170 and allow vectors from any time point in a time series to be created from vector data for a single time point. Compression of vector data is discussed in more detail subsequently and particularly in respect to the discussion of FIG. 6. As will be explained in more detail subsequently, and particularly with respect to FIGS. 3A-3B, 4A-4C, 5A-5B, and 7, the delta encoding information generated by server 100 enables vector data for any time point to be used to decompress and reconstruct vector data for any other time point of a time-series data set. As will also be explained in more detail subsequently, and particularly with respect to FIG. 8, the delta encoding information generated by server 100 can also be used to quickly identify time points in which a data file was changed or modified, or to otherwise identify differences between data files corresponding to different time points in the time series. Notably, the delta encoding information generated by server 100 can be used to identify differences in the data file(s) of a time-series data set corresponding to any time points in the time series, including time points that are not temporally adjacent (i.e., time points that are not adjacent in the time series). Server 100 can compress vector data for any number of time points in any number of time-series data sets.

Processor 102 can execute software, applications, and/or programs stored on memory 104. Examples of processor 102 can include one or more of a processor, a microprocessor, a controller, a digital signal processor (DSP), an application specific integrated circuit (ASIC), a field-programmable gate array (FPGA), or other equivalent discrete or integrated logic circuitry. Processor 102 can be entirely or partially mounted on one or more circuit boards.

Memory 104 is configured to store information and, in some examples, can be described as a computer-readable storage medium. Memory 104, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in RAM or cache). In some examples, memory 104 is a temporary memory. As used herein, a temporary memory refers to a memory having a primary purpose that is not long-term storage. Memory 104, in some examples, is described as volatile memory. As used herein, a volatile memory refers to a memory that that the memory does not maintain stored contents when power to the memory 104 is turned off. Examples of volatile memories can include random access memories (RAM), dynamic random access memories (DRAM), static random access memories (SRAM), and other forms of volatile memories. In some examples, the memory is used to store program instructions for execution by the processor. Memory 104, in one example, is used by software or applications running on server 100 (e.g., by a computer-implemented machine-learning model) to temporarily store information during program execution.

Memory 104 can further be configured for long-term storage of information. In some examples, memory 104 includes non-volatile storage elements. Examples of such non-volatile storage elements can include, for example, magnetic hard discs, optical discs, floppy discs, flash memories, or forms of electrically programmable memories (EPROM) or electrically erasable and programmable (EEPROM) memories.

User interface 106 is an input and/or output device and/or software interface, and enables an operator to control operation of and/or interact with software elements of server 100. For example, user interface 106 can be configured to receive inputs from an operator and/or provide outputs. User interface 106 can include one or more of a sound card, a video graphics card, a speaker, a display device (such as a liquid crystal display (LCD), a light emitting diode (LED) display, an organic light emitting diode (OLED) display, etc.), a touchscreen, a keyboard, a mouse, a joystick, or other type of device for facilitating input and/or output of information in a form understandable to users and/or machines.

In some examples, server 100 can operate an application programming interface (API) for facilitating communication between server 100 and other devices connected to network 180 as well as for allowing devices connected to network 180 to access functionality of server 100. A device connected to network 180, such as user device 190, can send a request to an API operated by server 100 to access functionality of server 100 described herein.

Vector database 150 is an electronic database that stores vector embeddings representative of data files. The data files can be, for example, image files, text files, or any other suitable type of file for generating vector embeddings. The vector embeddings stored in vector database 150 are generated using an embedding model/algorithm that creates vector embedding information representative of data files stored to data file store 160. The vector embeddings stored to vector database 150 are representative of data files belonging to time-series data sets.

Data file store 160 is an electronic database that is connected to server 100 via network 180. Data file store 160 stores time-series data sets to machine-readable data storage capable of retrievably housing stored data, such as database or application data. Data file store 160 can be any suitable type of database, and can organize and retrieve data stored in any suitable format. In some examples, data file store 160 can organize data using DBMS 162 (discussed in more detail subsequently). Data file store 160 can be, for example, a structured database (e.g., a table or relational database), a semi-structured database (e.g., a hierarchical and/or nested database), or an unstructured database. In some examples, data file store 160 includes long-term non-volatile storage media, such as magnetic hard discs, optical discs, flash memories and other forms of solid-state memory, or forms of electrically programmable memories (EPROM) or electrically erasable and programmable (EEPROM) memories.

Each time-series data set stored by data file store 160 describes a virtual or real-life object, event, etc. over time. More specifically, each time-series data set includes two or more data files each corresponding to different time points of the time series, and the time points of the time series are defined by attributes of the data files constituting the time-series data set. As referred to herein, a "time point" can include one or more of a calendar date, a time of day, or a time elapsed since a prior data file was collected, captured, created, or otherwise generated, among other options.

For example, a time-series data set can include satellite images of a particular geographic location at time points of the time series, such that the time-series data set can be used to understand changes to the geographic location over time. Successively-captured images of the geographic location can be stored to data file store 160 and associated with a time-series data set for the geographic location. In this example, the data files of such the time-series data set are the individual images and the time points of the time-series data set are defined by times at which the images were captured. Accordingly, each image (i.e., each data file) of the time-series data set corresponds to one time point of the time-series data set. The data files of the time-series data set stored to data file store 160 can include time information describing, for example, the time of day and the calendar date at which the image was taken.

As an additional example, a time-series data set can include successive versions of a text document. As a text document is revised, updated versions of the text document can be stored to data file store 160 and associated with the time-series data set for the text document. In this example, the data files of the time-series data set are the revisions of the text document and the time points of the time-series data set can be the dates at which those revised documents are created and/or stored to data file store 160.

As yet a further example, a time-series data set can include backups of all or a portion of a pool of data files (e.g., the data files of a file system, etc.). The pool of data files can be iteratively backed up to data file store 160 and vectors of the data files can be created to improve search and return more relevant results in response to user queries. In this example, the data files of the time-series data set are the backed up copies of the data files and the time points can be the dates on which the files were backed up.

Other possibilities of time-series data are possible and the aforementioned examples are non-limiting, illustrative examples. Any data corresponding to time points of a time series and for which vector embeddings can be generated can be stored to data file store 160. The time points of each time series may be the same as or different from the time points of other time-series data points stored to data file store 160. In at least some examples, all or substantially all time-series data stored to data file store 160 includes at least two data files corresponding to the same time points. In further examples, all data files of all time-series data stored to data file store 160 correspond to time points of a shared or common set of time points. Further, the time points of the time-series data can be at consistent intervals, non-consistent intervals, or any suitable mixture thereof. Data files and vector embeddings representative thereof that correspond to (i.e., were created on, captured on, etc.) adjacent time points of a time series can be referred to as "temporally adjacent."

To query vector database 150, server 100 (via query module 140A, discussed subsequently), user device 190 (via query module 140B, discussed subsequently), and/or vector database 150 can generate a vector embedding of a user query and compare that vector to the vectors stored to vector database 150. The vector embedding of the user query is referred to herein as a "query vector" and the vectors of the database are referred to herein as "database vectors." The query vector can be generated using the same embedding algorithm and/or have the same number of dimensions as the database vectors (i.e., the vectors of vector database 150). Vectors stored to vector database 150 having a similarity score above a particular threshold and/or having the highest overall similarity to the query vector can be returned in response to the query. Vector similarity can be assessed by cosine similarity, cartesian similarity, and/or any other suitable test for assessing vector similarity.

The vectors stored by vector database 150 and other vectors representative of time-series data stored to data file store 160 can be generated by one or more vector embedding algorithms of server 100 (e.g., a software component of embedding module 130), of vector database 150, and/or of any other suitable element of system 10. As will be explained in more detail subsequently, for each time-series data set of data file store 160, vector database 150 generally stores one vector embedding representative of a single data file. Server 100 can reconstruct or recreate vector embeddings corresponding to other time points of each time-series data set based on the delta encoding information stored to delta encoding database 170 and, optionally, can temporarily store recreated vector embeddings to vector database 150.

Delta encoding database 170 is another electronic database that is connected to server 100 via network 180 and stores delta encodings generated by server 100. The delta encodings stored by delta encoding database 170 describe differences between the vector embeddings of data files corresponding to adjacent time points of a time-series data set. Each delta encoding describes differences between each element or dimension (i.e., number, etc.) of vector embeddings for any two adjacent time points of a time series, such that a vector embedding for one time point and the delta encoding information can be used to recreate the vector embedding for the other, adjacent time point. Delta encodings can be generated by, for example, subtracting dimensional values of a vector corresponding to one time point from the corresponding dimensional values of a vector corresponding to another, adjacent time point. As referred to herein, dimensional values that "correspond" belong the same position in each vector's numeric array.

The delta encodings stored by delta encoding database 170 have reduced file size as compared to the vector embeddings used to generate the delta encodings, and thereby function to compress those vector embeddings. As the delta encodings disclosed herein store the differences between the dimensional values (i.e., elements) of vector embeddings for adjacent time points, the delta encodings disclosed herein reduce the file size required to store vector data, especially in examples where one or more dimensional values of the vector embeddings of adjacent time points are identical or substantially identical. Where vector embeddings of adjacent time points are at least partially identical, the resultant delta encoding can optionally only encode delta values for the dimensional values that differ. Further, in examples where vector embeddings of adjacent time points are entirely identical, delta encoding database 170 can store a zero or another null value, significantly reducing the byte size required to store values for the temporally-adjacent vector embeddings. In some examples, delta encoding database 170 can be configured such that no value is stored to delta encoding database 170 where two temporally-adjacent vector embeddings are identical and, further, server 100 can be configured to recognize an absence of delta encoding information describing differences between two time points to indicate that the vector embeddings for those time points had identical dimensional values.

Delta encodings stored to delta encoding database 170 and generated by server 100 can have any suitable format. For example, delta encodings stored to delta encoding database 170 can store only the position (i.e., within the vector arrays of temporally-adjacent vector embeddings) and the value of differences between differing dimensional values. Storing position data in addition to a numeric difference (i.e., rather than the difference between all values) can advantageously reduce file size of a delta encoding in examples where significant quantities of values are the same in both temporally-adjacent vector embeddings. Specifically, delta encodings that store position and numeric difference data do not need to encode zero values for dimensions of temporally-adjacent vector embeddings that are the same or, in some examples, are substantially the same (i.e., that have a numeric difference below a threshold difference value). Difference and position values can be stored as arrays, tables, strings, or in any other suitable format. In these examples, delta encodings can be omitted for vectors that are completely identical or are substantially identical such that corresponding dimensional values for each adjacent vector embedding are within a threshold similarity, and server 100 can be configured to recognize that an absence of delta encoding information describing differences between two time points to indicate that the vector embeddings for those time points had identical dimensional values.

Additionally and/or alternatively, delta encodings stored to delta encoding database 170 can be structured as arrays having the same number of dimensions as the vectors from which those encodings were derived. In these examples, the delta encodings can store zero values to represent dimensional values of temporally-adjacent vector embeddings that are the same or substantially the same (e.g., within a threshold value). In some of these examples, delta encodings can be omitted for vectors that are completely identical or are substantially identical such that corresponding dimensional values for each adjacent vector embedding are within a threshold similarity, and server 100 can be configured to recognize that an absence of delta encoding information describing differences between two time points to indicate that the vector embeddings for those time points had identical dimensional values.

Delta encoding database 170 can be any suitable type of database, and can organize and retrieve data stored in any suitable format. In some examples, Delta encoding database 170 can organize data using DBMS 172 (discussed in more detail subsequently). Delta encoding database 170 can be, for example, a structured database (e.g., a table or relational database), a semi-structured database (e.g., a hierarchical and/or nested database), an unstructured database, or a vector database.

DBMS 162, 172 are database management systems. As used herein, a "database management system" refers to a system of organizing data stored on a data storage medium. In some examples, a database management system described herein is configured to run operations on data stored on the data storage medium. The operations can be requested by a user and/or by another application, program, and/or software. The database management system can be implemented as one or more computer programs stored on at least one memory device and executed by at least one processor to organize and/or perform operations on stored data. DBMS 162 is an optional element of data file store 160 that is included in examples where data file store 160 is or includes a database that organizes data using a DBMS (e.g., where data file store 160 is a structured database). Similarly, DBMS 172 is an optional element of delta encoding database 170 that is included in examples delta encoding database 170 is or includes a database that organizes data using a DBMS (e.g., where delta encoding database 170 is a structured database).

Network 180 is a network suitable for connecting and facilitating network communication between two or more of server 100, vector database 150, data file store 160, delta encoding database 170, and user device 190. Network 180 can include any suitable combination of local network and wide area network (WAN) elements or components to facilitate communication between two or more of two or more of server 100, vector database 150, data file store 160, delta encoding database 170, and user device 190. In some examples, network 180 can be or include the Internet.

User device 190 is an electronic device that a user (e.g., user 198) can use to access network 180 and functionality of server 100 (i.e., via network 180). User device 190 includes processor 192, memory 194, and user interface 196, which are substantially similar to processor 102, memory 104, and user interface 106, respectively, and the discussion herein of processor 102, memory 104, and user interface 106 is applicable to processor 192, memory 194, and user interface 196, respectively. User device 190 includes networking capability for sending and receiving data transmissions via network 180 (i.e., as electronic signals representative of data) and can be, for example, a personal computer or any other suitable electronic device for performing the functions of user device 190 detailed herein. In some examples, user device is configured to send data as one or more network packets. Memory 194 optionally stores software elements query module 140B, which will be discussed in more detail subsequently.

Encoding module 110 is a software element of server 100 and includes one or more programs for generating delta encodings based on vector information. The program(s) of encoding module 110 are configured to receive vector information from vector database 150 or another suitable source of vector data, and/or to retrieve vector information from vector database 150 and to generate delta encodings as described above with respect to the discussion of vector database 150, data file store 160, and delta encoding database 170. In some examples, encoding module 110 can also be configured to generate vector embeddings representative of time-series data (e.g., data stored to data file store 160). The process of creating a delta encoding can be referred to as "encoding" or "compressing" a time-series vector embedding. The program(s) of encoding module 110 can be further configured to store delta encodings to delta encoding database 170 and to modify data stored to vector database 150 (e.g., to delete data corresponding to a compressed vector embedding represented by a delta encoding).

Playback module 120 is a software element of server 100 and includes one or more programs for reconstructing or recreating vector embedding information based on a set of vector embeddings and delta encoding information stored to delta encoding database 170. The process of reconstructing or recreating a vector embedding from a delta encoding and a vector embedding corresponding to an adjacent time point can be referred to as "decoding" or "decompressing" a time-series vector embedding. The process of reconstructing or recreating time-series vector embedding information can also be referred to as "playback" of the time-series of vector embeddings. Playback module 120 is able to recreate vectors in the "reverse direction," in which vector embeddings for time points prior to the starting vector embedding are recreated, as well as in the "forward direction," in which vector embeddings for time points subsequent to the starting vector are recreated. Time-series vector embedding playback is described in more detail subsequently, and particularly with respect to FIGS. 3A-3B, FIGS. 4A-4C, and FIGS. 5A-5B.

In some examples, playback of time-series vector embeddings can be configured create new vector embedding data representative of the encoded time-series vectors. For each time series for which playback is desired, a single starting vector embedding can be used to create new copies of other vector embeddings of the time series using delta encoding information from delta encoding database 170. In other examples, playback of time-series vector embeddings can be configured to modify data of the starting vector embedding rather than to create new vector embedding data. That is, to recreate a vector embedding for an time point adjacent to the time point of the starting vector embedding, the data (i.e., stored to vector database 150, memory 104, etc.) for the starting vector embedding can be modified using the corresponding delta encoding to transform the starting vector embedding into the vector embedding for the adjacent time point.

Embedding module 130 is another software element of server 100 and includes one or more programs for generating vector embeddings of time-series data (e.g., data stored to data file store 160). Embedding module 130 can use any suitable method or algorithm to vectorize text, such as a word2vec method, a bag of words term frequency method, a binary term frequency method, and/or a normalized term frequency method, among other options. In some examples, one or more neural networks can be used by embedding module 130 to create the vector embeddings. Embedding module 130 can be configured to store vector embeddings of time series data to vector database 150, memory 104, or another suitable storage device or location. The embedding algorithm(s) used by embedding module 130 is/are deterministic, such that the algorithm(s) can be used to create vector embeddings suitable for compression by encoding module 110 and decompression by playback module 120. That is, the use of deterministic embedding algorithm(s) allows for vectors of identical data files to also be identical, thereby enabling the vector compression and decompression scheme outlined previously in the discussion of encoding module 110 and playback module 120.

Query modules 140A, 140B are optional software elements of server 100 and user device 190, respectively, and are configured to query and retrieve data from one or more of vector database 150, data file store 160, and delta encoding database 170. Query modules 140A, 140B can be configured to generate query vectors based on user queries and to query vector database 150 using those query vectors. The query vectors generated by query modules 140A, 140B can be generated using the same embedding algorithm used to encode vectors to vector database 150 and, as described previously, vector similarity can be assessed by cosine similarity, cartesian similarity, and/or any other suitable test for assessing vector similarity. User queries encoded by query modules 140A, 140B can be, for example, user-submitted text information, user-submitted image information, etc. Vectors stored to vector database 160 having a similarity score above a particular threshold and/or having the highest overall similarity to the query vector can be returned in response to the query and query modules 140A, 140B, can retrieve the corresponding data file(s) of data file store 160 and provide the data file(s) to the user who generated the query. While query modules 140A, 140B are generally described herein as generating query vectors, in some examples, query modules 140A, 140B are not configured to generate query vectors and are instead configured to receive user queries and provide those queries to vector database 150, and vector database 150 is configured to generate query vector(s) and to query data of vector database 150.

Query modules 140A, 140B can, in some examples, be configured to retrieve delta encodings from delta encoding database 170 and can provide those delta encodings to playback module 120 to recreate prior and/or subsequent vector embeddings (i.e., prior and/or subsequent to a starting vector embedding stored to vector database 150). Query modules 140A, 140B can then search the recreated vector information.

In examples where playback module 120 is configured to create new copies of vector embedding information that can be temporarily stored to vector database 150, memory 104, or another suitable memory device, query module 140A, 140B can be configured to search all vector embeddings for all recreated time points. In some of these examples, the user query can specify a time range in addition to query terms, and query modules 140A, 140B can cause playback module 120 to recreate vector embeddings for time points within the user-specified range.

In examples where playback module 120 is configured to recreate vector embeddings by modifying or overwriting data for a starting vector embedding, query modules 140A, 140B can, for example, search the vector embeddings for each time point iteratively. For example, query modules 140A, 140B can first search vector embeddings for the starting time point (i.e., according to similarity to the query), playback module 120 can recreate vector embeddings for the next adjacent time point, query modules 140A, 140B can search vector embeddings for that time point (i.e., according to similarity to the query), playback module 120 can recreate vector embeddings for the next adjacent time point, and so on such that the aforementioned process is repeated for all desired time points. In these examples, the user query can also define a time range to be searched and query modules 140A, 140B can cause playback module 120 to recreate vector embeddings for time points within the user-specified range.

Recreating vector data by creating new vector embeddings can advantageously simplify the querying process described subsequently by allowing a single query or search to be performed of all recreated vectors rather than iterative queries in a time point-by-time point manner. Further, recreating vector data by modifying or overwriting vector data for starting vector embeddings can advantageously reduce the storage space required to recreate vector information.

In some examples, query modules 140A, 140B can be configured to generate a query and to retrieve data from data file store 160 using a type of query data that differs from data stored to data file store 160. For example, data file store 160 can store image data that is represented by vector embeddings stored to vector database 150. Image data stored to data file store 160 can be labeled with user-generated text information that can be searched using a user-submitted text string according to any suitable text search algorithm, such as a string-matching algorithm, a keyword matching algorithm, etc. In some examples, vector embeddings of the user-generated text labels can also be generated and stored to a vector database, and can be searched substantially as described herein with respect to searching of vector database 150. Advantageously, this type of data labeling can simplify the user query process (e.g., by allowing a user to search using text rather than a query image) while still enabling the advantages disclosed herein with respect to delta encoding search, and particularly with respect to the identification of changes to time-series data described in subsequent discussion of query modules 140A, 140B and in the discussion of FIG. 8.

In some examples, query modules 140A, 140B can also be configured to identify changes in time-series data using delta encoding information stored to delta encoding database 170. For example, a user can provide a query that requests one or more time points (e.g., within a range, of all available time points, etc.) for which a data file of a time-series data set differs from a prior (or subsequent) temporally-adjacent data file. For time points in which there is a change to the time-series data, the corresponding delta encoding will have a non-zero value. As such, for a given time-series data set, query modules 140A, 140B can be configured to search for delta encodings having non-zero values to identify time points at which the time-series data changed. The change can be, for example, a revision to a text file, a change to an image file of time-series image data (i.e., corresponding to a change in the subject of the image file), or any other suitable type of change. Query modules 140A, 140B can retrieve one or more data files for the identified time point(s) and provide the data file(s) to the user who generated the query. The user can specify the time-series data set to identify time points corresponding to changes between data files. Additionally and/or alternatively, the user can submit a query to one of query modules 140A, 140B to identify one or more vectors of vector database 150, as described previously. Query modules 140A, 140B can then identify changes to the time-series data set(s) to which the data file(s) represented by the retrieved vector(s) belong according to delta encoding information for the data set(s). The identification of changes between data files of time-series data sets using delta encodings can be referred to as "difference search" or "delta search."

Advantageously, system 10 enables compression and decompression (i.e., "playback") of time-series vector data. System 10 also enables the use of compressed vector information to rapidly identify time points associated with changes between data files of time-series data. The vector compression enabled by system 10 can significantly reduce the storage required to store vector representations of time-series data.

While server 100, vector database 150, data file store 160, and delta encoding database 170 are depicted as separate devices in FIG. 1, in other examples, two or more of server 100, vector database 150, data file store 160, and delta encoding database 170 can be virtualized on a single device or on the same distributed set of devices. Additionally and/or alternatively, while server 100, vector database 150, data file store 160, delta encoding database 170, and user device 190 are depicted as single devices in FIG. 1, server 100, vector database 150, data file store 160, delta encoding database 170, and user device 190 can each be distributed across any suitable number of devices.

Figure 2:
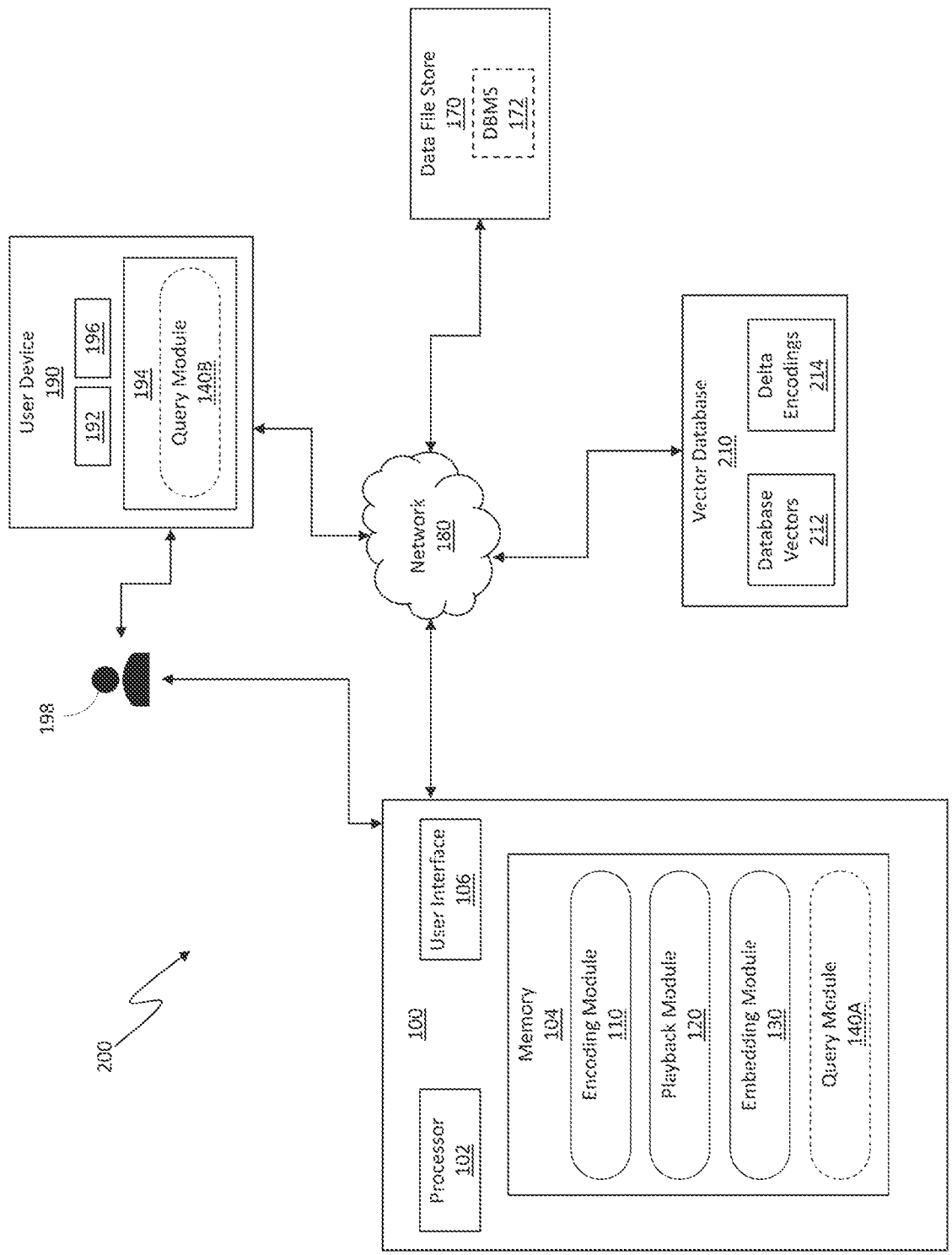
FIG. 2 is a schematic diagram of a further example of a system for generating and using compressed vector embedding data.

FIG. 2 is a schematic diagram of system 200 which is a system for compressing and decompressing vector data, as well as for performing various searches of compressed vector data. System 200 is substantially similar to system 10, but includes vector database 210 instead of vector database 150 and delta encoding database 170. In system 200, database vectors are stored to vector database 210 as database vectors 212 and delta encodings are also stored to vector database 210 and as delta encodings 214. In system 200, delta encodings 214 are structured as arrays (i.e., as vector embeddings) such that delta encodings 214 can be stored to and retrieved from vector database 210. Accordingly, in system 200, vector database 210 stores both starting vector embeddings for time-series data sets as well as the delta encodings required to decompress vector embeddings for other time points of the time-series data sets.

FIGS. 3A and 3B are schematic depictions of compressed vector data 300A and compressed vector data 300B, respectively. Compressed vector data 300A, 300B are vector embeddings and delta encodings for data files of a single time-series data set. FIGS. 3A and 3B are discussed together herein and each depict vector embeddings 310A-310N, delta encodings 320A-320C, time points A-N, arrow F, and arrow R. FIGS. 3A and 3B together illustrate decompression or "playback" of vector information based on delta encoding information.

As depicted in FIGS. 3A-3B, each of vector embeddings 310A-310N corresponds to one time point A-N. More specifically, vector embedding 310A corresponds to time point A, vector embedding 310B corresponds to time point B, vector embedding 310C corresponds to time point C, vector embedding 310D corresponds to time point D, and vector embedding 310N corresponds to time point N. Arrow R points backwards in a time direction and arrow F points forwards in a time direction, such that time point B is subsequent to time point A and prior to time point C, time point C is subsequent to time point B and prior to time point D, and time point D is subsequent to time point C and prior to time point N. Time point B is adjacent to time points A and C, and time point C is adjacent to time points B and D. Time point D is not adjacent to time point N in the depicted example. Further, in the depicted example, time point A is the earliest time point in the time series and time point N is the most-recent or latest time point.

Further, delta encodings 320A-320D represent the differences between vector embeddings for adjacent time points. More specifically, delta encoding 320A represents differences between vector embedding 310A and vector embedding 310B, delta encoding 320B represents differences between vector embedding 310B and vector embedding 310C, and delta encoding 320C represents differences between vector embedding 310C and vector embedding 310D. Additional delta encodings (not depicted) describe differences between vector embeddings corresponding to time points temporally-situated between time point D and time point N. Vector embedding 310B can be recreated from the data of vector embedding 310B using delta encoding 320A, vector embedding 310C can be recreated from vector embedding 310A using delta encodings 320A-320B, vector embedding 310D can be recreated from vector embedding 310A using delta encodings 320A-320C, and vector embedding 310N can be recreated from vector embedding 310A using delta encodings 320A-320D as well as all intervening delta encodings (not depicted) linking vector embedding 310N to vector embedding 310D.

Compressed vector data 300A and 300B are substantially similar but differ in the vector embedding that is stored (and can be used as a starting vector for decompression). In particular, FIGS. 3A and 3B depict "forward playback" or decompression of vector embeddings corresponding to time points subsequent to the starting vector embedding. In FIGS. 3A-3B, solid lines depict data that is stored to a database, and dotted lines depict data that can be reconstructed or recreated via decompression, but is not stored to a database. As such, with respect to compressed vector data 300A (FIG. 3A), vector embedding 310A is stored to vector database 150 and delta encodings 320A-320C are stored to delta encoding database 170. Vector embeddings 310B, 310C, 310D, 310N are not stored to vector database 150 or any other database, but the data for vector embeddings 310B, 310C, 310D, 310N can be recreated using delta encoding information (e.g., delta encodings 320A-320C). In compressed vector data 300B (FIG. 3B), vector embedding 310C has been recreated using delta encodings 320A-320B and the vector data for vector embedding 310A.

Playback module 120 decompresses vector data using delta encodings 320A and 320B, in sequence, to recreate vector embedding 310C. More specifically, playback module 120 recreates vector embedding 310B using delta encoding 320A and vector embedding 310A, and then playback module subsequently recreates vector embedding 310C using delta encoding 320B and vector embedding 310B. Notably, FIGS. 3A-3B depict a method of recreating vector data by modifying or overwriting existing vector data to transform the existing vector data (in this example, representative of vector embedding 310A) into the desired vector data (in this example, representative of vector embedding 310C). In this example, data for vector embedding 310A can be restored by reverse playback (i.e., decompression in the time direction indicated by arrow R), described in more detail with respect to FIGS. 4B-4C. In other examples, both vector embeddings 310A and 310C can be stored following decompression such that vector embedding 310C is new data and is not created by modifying data for vector embedding 310A. In yet further examples, all of vector embeddings 310A-310C can be stored following decompression.

Figure 4C:
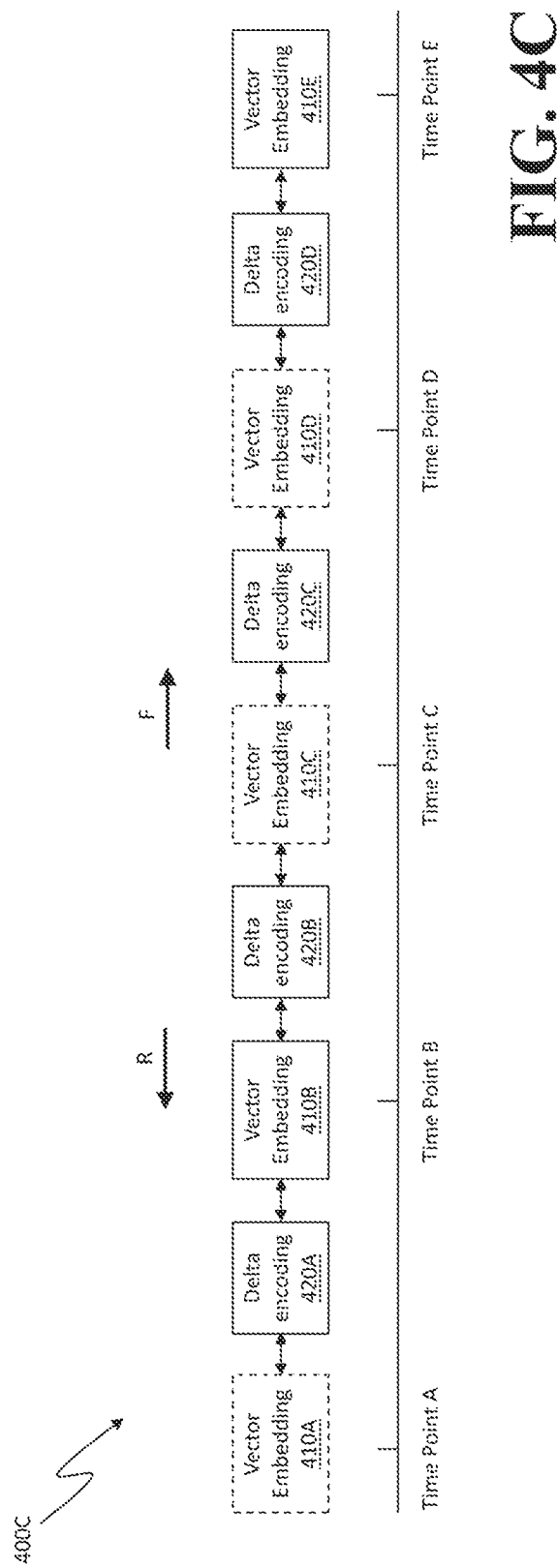
FIG. 4C is a schematic diagram of the example of compressed vector data of FIGS. 4A-4B following decompression.

FIGS. 4A, 4B, 4C are schematic depictions of compressed vector data 400A, compressed vector data 400B, and compressed vector data 400C, respectively. FIGS. 4A-4C are discussed together herein. Compressed vector data 400A includes vector embeddings 410A-410D, delta encodings 420A-420C, time points A-D, arrow F, and arrow R. Compressed vector data 400B and 400C each include vector embeddings 410A-410E, delta encodings 420A-420D, time points A-E, arrow F, and arrow R. Compressed vector data 400B includes an additional time point in the time-series data set represented by compressed vector data 400A, such that FIGS. 4A-4B together depict creation of delta encoding data in examples where only the most recent vector embedding data is stored. Further, compressed vector data 400C includes an additional stored vector embedding, such that FIGS. 4B-4C depict decompression or "playback" of vector information based on delta encoding information. Like in FIGS. 3A, 3B, solid lines are used in FIGS. 4A-4C to depict data that is stored to a database, and dotted lines are used to depict data that can be reconstructed or recreated via decompression, but that is not stored to a database. Similarly, arrow R points backwards in a time direction and arrow F points forwards in a time direction.

In vector data 400A (FIG. 4A), vector embedding 410D corresponds to the most-recent time point and is the only vector embedding of vector embeddings 410A-410D that are stored. Delta encodings 420A-420D are stored and can be used to recreate vector embeddings 410A-410C using vector embedding 410D. Delta encoding 420A represents differences between vector embedding 410A and vector embedding 410B, delta encoding 420B represents differences between vector embedding 410B and vector embedding 310C, and delta encoding 420C represents differences between vector embedding 410C and vector embedding 410D. Vector embedding 410C can be recreated from the data of vector embedding 410D using delta encoding 420D, vector embedding 410B can be recreated from vector embedding 410D using delta encodings 420B-420C, and vector embedding 410A can be recreated from vector embedding 410D using delta encodings 420A-420C.

Vector data 400B (FIG. 4B) includes data corresponding to a new time point (i.e., time point E) that has been added to the time series. Vector embedding 410E is created from a new data file in the time series corresponding to time point E, which is subsequent to time point D, and delta encoding 420D is created to represent and store differences between the dimensional values of vector embedding 410D and vector embedding 410E. Vector embedding 410D is then deleted, such that only the vector embedding corresponding to the most recent time point (i.e., vector embedding 410E for time point E) is maintained in vector database 150. Vector data for vector embeddings 410A-410D can be recreated using vector embedding 410E and all delta encodings linking vector embedding 410E to the desired vector embedding (i.e., for which data is desired to be recreated).

Vector data 400C (FIG. 4C) includes data for vector embedding 410B that has been recreated using playback module 120. In this manner, FIGS. 4B and 4C depict "reverse playback" or decompression of vector embeddings corresponding to time points prior to the starting vector embedding. FIG. 4C depicts the creation of new vector embedding data, such that vector data for vector embedding 410E is maintained in vector database 150 while new vector data is created for vector embedding 410B. Playback module 120 creates a new copy of data for vector embedding 410E and to use as the starting vector embedding for playback or vector recreation, and subsequently modifies that new vector data using delta encodings extending backwards in time (i.e., in the direction indicated by arrow R) to recreate data for vector embedding 410B. Specifically, playback module 120 uses delta encoding 420D, delta encoding 420C, and delta encoding 420B. While FIGS. 4B-4C together depict the creation of new vector data during reverse playback, in other examples, reverse playback can be performed by overwriting vector data of the starting vector (i.e., such that vector embedding 410E is no longer stored following playback). In these examples, following reverse playback, vector embedding 410E can be recreated by forward playback as described with respect to FIGS. 3A-3B. In yet further examples, data for intervening vector embeddings can also be created, such that vector data for one or both of vector embedding 410C and vector embedding 410D is created by vector decompression.

FIGS. 5A and 5B are schematic depictions of compressed vector data 500A and compressed vector data 500B. FIGS. 5A-5B will be discussed together herein and depict the creation of a new delta encoding in examples where vector embedding data for a time point other than most-recent time point is maintained such that it is used as the starting vector data for playback or decompression. FIG. 5A depicts vector embeddings 510A-510D, delta encodings 520A-520C, and time points A-D. FIG. 5B depicts vector embeddings 510A-510E, delta encodings 520A-520D, and time points A-E. FIGS. 5A-5B both depict arrow R and arrow F, which point backwards and forwards in a time direction, respectively. Further, like FIGS. 3A-3B and FIGS. 4A-4C, solid lines are used in FIGS. 5A-B to depict data that is stored to a database, and dotted lines are used to depict data that can be reconstructed or recreated via decompression, but that is not stored to a database.

In compressed vector data 500A and 500B (FIGS. 5A-5B), vector embedding 510B is stored for use as a starting vector. Delta encodings 520A-D are stored and can be used to recreate vector embeddings 510A-510E using vector embedding 510B. Delta encoding 520A represents differences between vector embedding 510A and vector embedding 510B, delta encoding 520B represents differences between vector embedding 510B and vector embedding 510C, and delta encoding 520C represents differences between vector embedding 510C and vector embedding 510D. Vector embedding 510 can be recreated from the data of vector embedding 510B using delta encoding 520A (i.e., via "reverse" playback), vector embedding 510C can be recreated using delta encoding 520B (i.e., via "forward" playback), vector embedding 510D can be recreated from vector embedding 510B using delta encodings 520B-520C, and vector embedding E can be recreated from vector embedding 510B using delta encodings 520B-520D.

Vector data 500B includes time point E, which is a new time point subsequent to the most-recent time point in vector data 500A (i.e., time point D). Vector embedding 510E is created from the data file (i.e., of the time-series data set) for time point E. Vector data for vector embedding 510D is recreated from vector embedding 510B and delta encodings 520B-520C, and used in combination with vector embedding 510E to create delta encoding 520D. Vector embedding 510E is then deleted. In examples where vector embedding 510D was recreated as new vector data, vector embedding 510D can be deleted. In examples where vector embedding 510D was created by overwriting or modifying the data for vector embedding 510B (i.e., without creating a new copy of vector data), vector decompression can be performed in the direction indicated by arrow R to recreate vector embedding 510B for the earlier time point B.

FIGS. 3A-3B, 4A-4C, and 5A-5B visually demonstrate the manner in which vector data for adjacent time points are serially linked by delta encodings and, further the manner in which vector data can be reconstructed from a starting vector embedding for a time point and all delta encodings that link the starting vector embedding to a desired vector embedding for a different time point. Although FIGS. 3A-3B, 4A-4C, and 5A-5B each depict a single time-series data set, the method of vector compression and decompression described with respect to FIGS. 3A-3B, 4A-4C, and 5A-5B can be applied to any number of time-series data sets to compress and decompress vector data for those time-series data sets. Vector decompression can be performed for any suitable number of time-series data sets individually or in another substantially non-simultaneous manner, and/or can be performed simultaneously or substantially simultaneously for any suitable number of time-series data sets. Further, each time-series data set can have any number of time points. FIGS. 3A-3B, 4A-4C, and 5A-5B include a representative number of time points selected for explanatory purposes. In other examples, data sets having compressible vector data can have fewer time points than the number shown in any of FIGS. 3A-3B, 4A-4C, 5A-5B or more time points than the number shown in any of FIGS. 3A-3B, 4A-4C, 5A-5B.

While vector decompression by playback module 120 is generally described herein as the application of delta encodings in a chronological order (i.e., in a direction indicated by one of arrows R and F) for explanatory convenience, intervening delta encodings (i.e., delta encodings that link two vector embeddings) can be applied to a starting vector embedding in any suitable order, including non-chronological orders, to create the desired vector embedding. Further, while vector decompression is generally described herein as the sequential application of delta encodings, vector decompression can also be accomplished by first creating a "net" delta encoding that represents the next changes to dimensional values from any desired number of delta encodings (e.g., by addition of the delta encodings) and then by applying the net delta encoding to the existing vector embedding.

Figure 6:
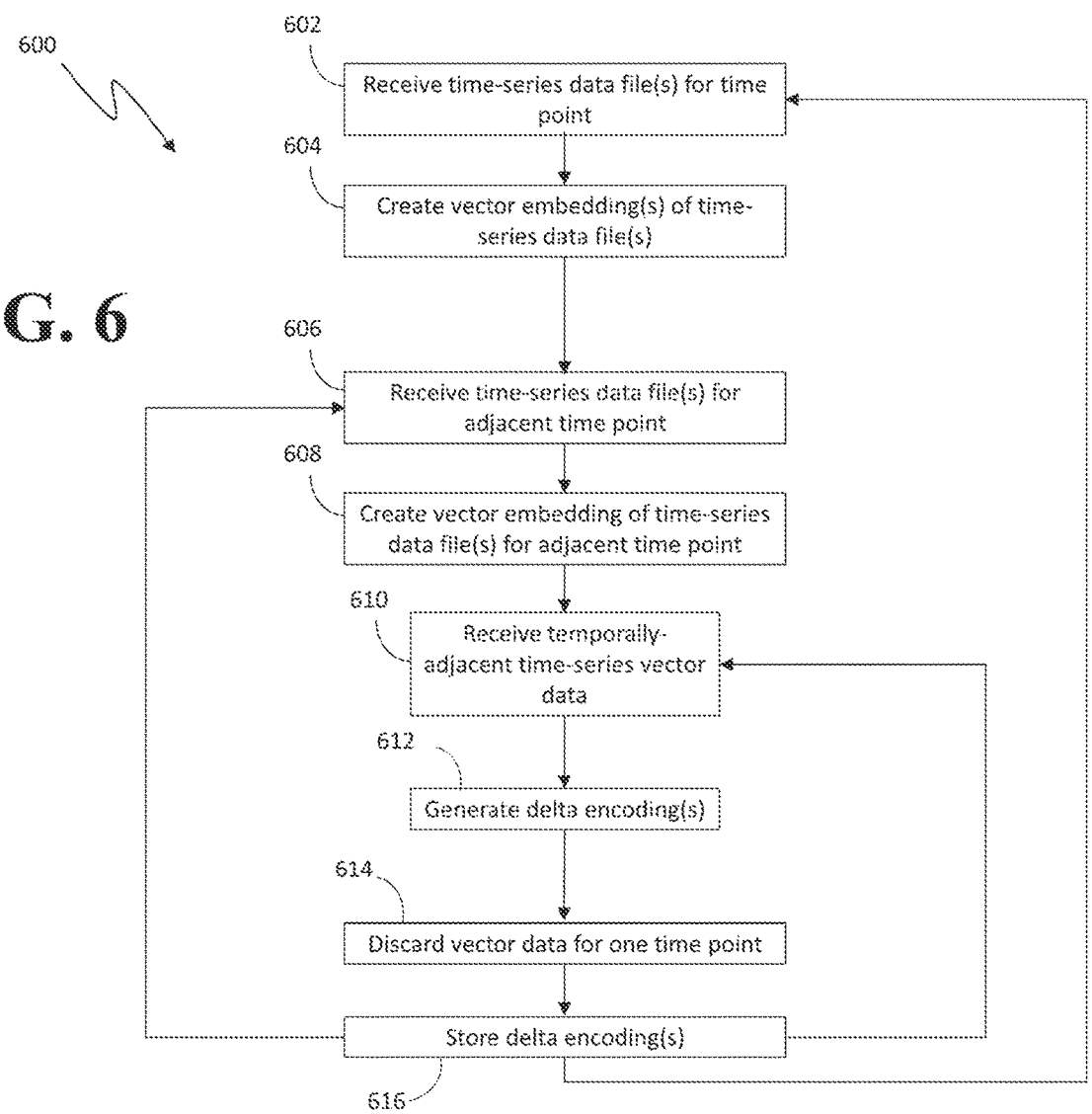
FIG. 6 is a flow diagram of an example of a method of vector embedding compression.

FIG. 6 is a flow diagram of method 600, which is a method of compressing vector data. Method 600 includes steps of 602-616 of receiving time-series data file(s) for a time point (step 602), creating vector embedding(s) of the time-series data file(s) (step 604), receiving time-series data file(s) for a subsequent time point (step 606), creating a vector embedding of the time-series data file(s) for the subsequent time point (step 608), receiving temporally-adjacent time-series vector data (step 610), generating delta encoding(s) (steps 612A-N), discard vector data for one time point (step 614), and storing the delta encoding(s) (step 616). Method 600 can be performed to create delta encodings for any number of vector embeddings of any number of time-series data sets. Method 600 is described herein generally with respect to compressing vector embeddings for a single time point, but multiple instances of method 600 can be performed in parallel to compress vector embeddings for any number of time points of any number of time-series data sets (i.e., including time-series data sets having different time points). Further, method 600 is described generally herein with respect to system 10, but method 600 can be performed on system 200 and/or any other suitable system.

In step 602, server 100 or another suitable device of system 10 receives time-series data file(s) for a time point. The time-series data file(s) can be retrieved from, for example, data file store 160 or any other suitable source of data files. The data file(s) can also be provided, for example, from user device 190 via network 180 and/or any other suitable device connected to network 180.

In step 604, vector embedding(s) are generated for the time-series data file(s) received in step 604. The vector embedding(s) can be generated by, for example, server 100, vector database 150, and/or any other suitable device of system 10. The vector embedding(s) can be generated using any suitable vectorization method or algorithm, such as a word2vec method, a bag of words term frequency method, a binary term frequency method, and/or a normalized term frequency method, among other options.

Steps 602 and 604 are optional steps of method 600 and are performed in examples of method 600 where it is desirable to create starting vector embedding(s). In examples where vector embedding(s) of the time-series data file(s) already exist, steps 602 and 604 can be omitted. In some examples, steps 602 and 604 can be performed to vectorize data file(s) of time-series data set(s) for which starting vector embeddings do not exist, and then steps 606-616 can be performed for those time-series data set(s) as well as other time-series data set(s) for which starting vector embeddings do exist.

In step 606, server 100 or another suitable device of system 10 receives time-series data files for a time point adjacent to the time point for which data file(s) were received in step 602. The adjacency of the time point of the time-series data received in step 606 to the time point of step 602 allows delta encodings can be created from vector embedding(s) of the file(s) received in step 606 and the vector embedding(s) created in step 604. The adjacent time point can be subsequent to or prior to the time point of the data in step 602.

In step 608, vector embedding(s) are generated for the time-series data file(s) received in step 606. Vectorization in step 608 is performed in substantially the same manner as the vectorization performed in step 604, and the description of step 604 is applicable as such to step 608.

Steps 606-608 are also optional steps of method 600 and are performed in examples where vector embedding data does not exist for a time point adjacent to the time point corresponding to the starting vector embedding(s).

In step 610, server 100 receives temporally-adjacent time-series vector data. The temporally-adjacent time-series vector data includes vector embeddings representative of data files corresponding to two adjacent time points. The temporally-adjacent time-series vector data can be include any number of vector embeddings representative of time-series data for a starting time point and an equal number of vector embeddings representative of time-series data for an adjacent time point. The adjacent time point can be a prior time point or a subsequent time point, but is the immediately preceding or subsequent time point in the time series. Each pair of temporally-adjacent time-series vector data belongs to a single time series and, further, has the same number of vector dimensions (i.e., elements in the array), such that a delta encoding describing differences between corresponding dimensions or elements of the vector embeddings can be generated in subsequent step 612. The temporally-adjacent time-series vector data can be received by, for example, retrieving the vector data from vector database 150. The temporally-adjacent time-series vector data can also be received by, for example creating the vector embeddings in step 604 and 608 and storing those vector embeddings to memory 104 of server 100.

In some examples, it may be desirable to create a delta encoding for a new time point that is not adjacent to the time point for which starting vector data exists. The creation of delta encoding 520D described in the discussion of FIGS. 5A-5B is one example of a scenario in which it is desirable to create a new delta encoding for a time point that is not adjacent to the time point for which vector embedding data is stored and maintained. In these examples, a vector embedding for an adjacent time point can be generated by using appropriate delta encoding data and the existing vector embedding to recreate vector data for the desired, adjacent time point. In the example depicted in FIGS. 5A-5B, vector embedding 510B and delta encodings 520B-520C can be used to recreate vector embedding 520D, which can be used in combination with vector embedding 510E for new time point E to create delta encoding 520D. Decompression or playback to recreate vector embeddings from a starting vector embedding and the appropriate linking delta encodings is also discussed in more detail subsequently and particularly with reference to the discussion of FIG. 7.

In step 612, server 100 generates a delta encoding for each pair of temporally-adjacent time-series vector embeddings received in step 610. The delta encoding can be generated by, for example, subtracting the values of one vector embedding from the corresponding values (i.e., having the same position in the array) of the other vector embedding. The temporal order in which the vector values where subtracted can be stored and/or specified by a user (e.g., via user interface 106 and/or user interface 196 of user device 190), such that one vector embedding and the delta encoding can be used to recreate the other vector embedding (i.e., including all array values for the other vector embedding).

Delta encodings generated via step 612 can have any suitable structure for preserving the numeric differences between the two adjacent time-series vector embeddings. For example, a delta encoding can be structured as arrays of numbers and can, for example, have one number for each dimension of the temporally-adjacent vector embeddings. As an additional example, a delta encoding generated by step 612 can be structured as an array, table, or string that specify the position (i.e., in the numeric arrays of the temporally-adjacent vector embeddings) at which values between the temporally-adjacent vector embeddings differ and, further, the value of the difference between those corresponding values. Storing position data in addition to a numeric difference (i.e., rather than the difference between all values) can advantageously reduce file size of a delta encoding in examples where significant quantities of values are the same in both temporally-adjacent vector embeddings. Specifically, delta encodings that store position and numeric difference data do not need to encode zero values for dimensions of temporally-adjacent vector embeddings that are the same or, in some examples, are substantially the same (i.e., that have a numeric difference below a threshold difference value).

In step 614, for each pair of temporally-adjacent time-series vector embeddings, server 100 discards one vector embedding. As step 612 allows decompression of either vector based on the vector embedding of the other vector of the pair, either vector can be discarded in step 614. Specifically, either the vector embedding for the most-recent time point can be discarded or the vector embedding for the older time point can be discarded. The vector embedding that is discarded can be determined according to, for example, user preference, business or operational need, etc. Referring again to FIGS. 4A-4C, compressed vector data 400B and 400C demonstrate one example of the preservation of a vector embedding for a most-recent time point following delta encoding generation. Further, as discussed previously with reference to step 610, compressed vector data 500A and 500B (FIGS. 5A-5B) demonstrate one example of the preservation of a vector embedding for an earlier time point.

Where the vector embedding that is discarded is not stored to vector database 150 and is only stored to memory 104, server 100 can discard the vector embedding by deleting the vector embedding from memory 104. In examples where the discarded vector embedding is stored to vector database 150, server 100 can discard the vector embedding by, for example, modifying database data of vector database 150 to delete the vector embedding and/or by causing vector database 150 to delete the vector embedding, among other options.

In step 616, server 100 stores each delta encoding created in step 612 to delta encoding database 160. Server 100 can store the delta encoding by directly modifying data of delta encoding database 160 and/or by causing delta encoding database 160 to store the delta encoding. Method 600 can end following step 616 or optionally can proceed to one of steps 602, 606, and 610. Method 600 can proceed to step 602 to process data for a new time-series data set and/or for any number of time-series data sets for which starting vector embeddings do not exist. Method 600 can proceed to step 606 to compress vector data for new data corresponding to a new time point. Method 600 can also proceed to step 610 to compress vector data that already exists. In examples where the vector data to be compressed already exists, method 600 can be performed starting a step 610 rather than steps 602 or 606.

Method 600 advantageously enables the reduction of the storage size required to store vector information by compressing differences between adjacent vectors and representing those differences as smaller numeric values. Method 600 can further enable the reduction of storage size required to store vector information by representing dimensional values that are identical or substantially identical (i.e., within a threshold value of) corresponding dimensional values of adjacent vector embeddings as zero values or, in some examples, by only storing values representing differences that no values are required to compress corresponding dimensional values that are substantially the same.

Figure 7:
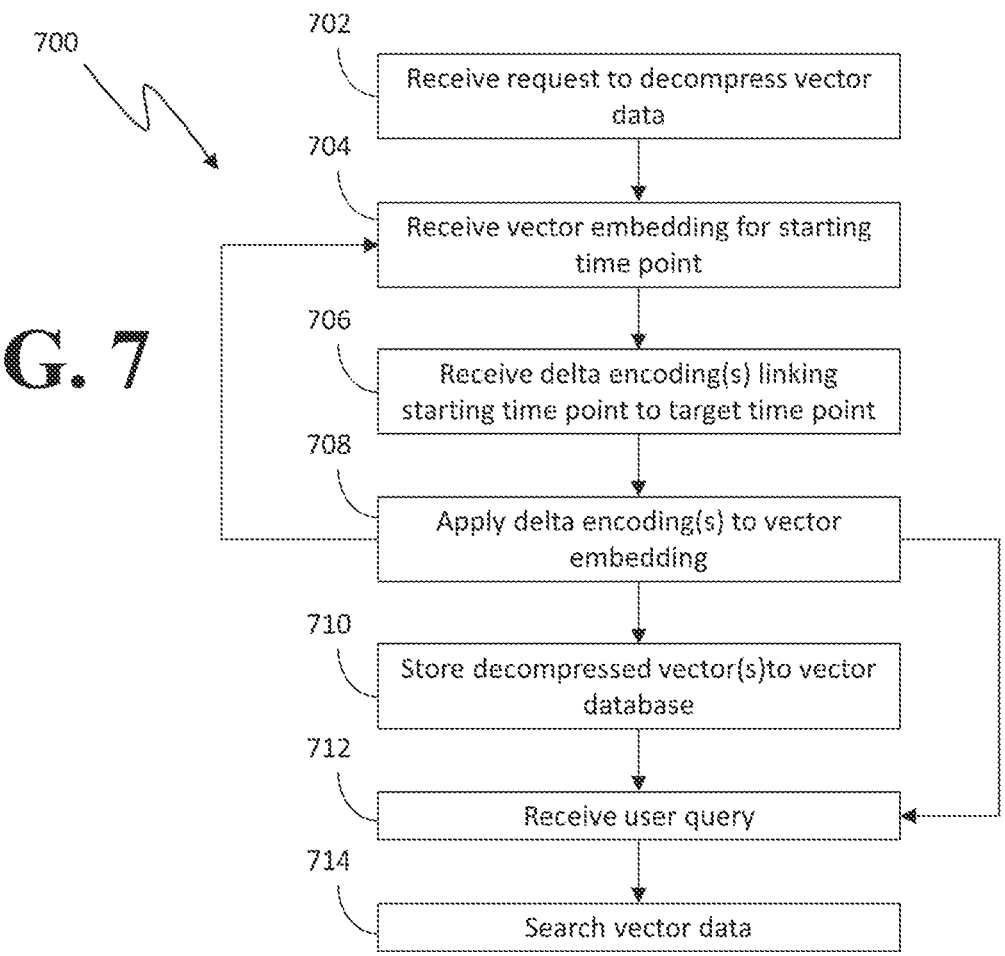
FIG. 7 is a flow diagram of an example of a method of vector embedding decompression.

FIG. 7 is a flow diagram of method 700, which is a method of decompressing vector data and, optionally, of searching decompressed vector data. Method 700 includes steps 702-714 of receiving a request to decompress vector data (step 702), receiving a vector embedding for a starting time point (step 704), receiving delta encoding linking the starting time point to the target time point (step 706), applying the received delta encodings to the starting vector embedding (step 708), storing the decompressed vectors to a vector database (step 710), receiving a user query (step 712), and searching vector data (step 714). Method 700 is generally described herein with respect to system 10 (FIG. 1), but method 700 can be performed by system 200 (FIG. 2) or any other suitable system for decompressing compressed vector data.

In step 702, server 100 receives a request to decompress vector data. The request can be provided by a user via user interface 106 and/or via user interface 196 of user device 190 and transmitted to server 100 via network 180. The request can specify, for example, the time point(s) for which vector data should be decompressed (e.g., as a range, as individual time points, etc.). The request can also specify, for example, specific time-series data sets that should be decompressed. In some examples, a user can query existing vector embeddings of vector database 150 (i.e., via one of query modules 140A/140B and/or functionality of vector database 150) to identify time-series data set(s) that the user would like to decompress, and the request to decompress those data set(s) can optionally be generated automatically and provided to server 100. The request can be submitted via a graphical user interface of server 100 and/or user device 190, via an API call, etc.

In step 704, server 100 receives a vector embedding for a starting time point. The starting time point is the time point for which vector data exists (i.e., is stored to vector database 150 during step 704) for a time-series data set of the time-series data set(s) identified in step 702. In some examples, step 704 can be performed at substantially the same time as step 702 and the vector embedding can be provided as part of the request received in step 702. Additionally and/or alternatively, server 100 can receive the vector embedding by retrieving the vector embedding from vector database 150.

In step 706, server 100 receives delta encoding linking the starting time point to the target time point. The target time point can be user defined and can be specified in the request received in step 702. In some examples, step 706 can be performed at substantially the same time as step 702 and the delta encoding(s) can be provided as part of the request received in step 702. Additionally and/or alternatively, server 100 can receive the vector embedding by retrieving the delta encoding(s) from delta encoding database 170.

As described previously and particularly with respect to the discussion of FIGS. 3A-3B, 4A-4C, and 5A-5B, delta encodings that "link" the vector embeddings corresponding to two time points are all delta encodings that describe differences between adjacent vector embeddings of all time points in a range defined by the starting time point and the target time point.

In some examples, the target time point can be an adjacent time point, such that method 700 decompresses vector data for a time point adjacent to (i.e., immediately subsequent or preceding) to the time point of the starting vector embedding. In other examples, the target time point can be a non-adjacent time point to the time point of the starting vector embedding.

In step 708, server 100 applies the delta encodings received in step 706 to the starting vector embedding (i.e., the vector embedding for the starting time point) received in step 704. Server 100 can, for each delta encoding, add or subtract the difference values of the delta encoding to the appropriate dimensional values of the starting vector embedding. Whether server 100 adds or subtracts values can be determined by scheme used to create the delta encoding and can be represented by one or more settings files stored to server 100. For example, if the delta encoding(s) are created by subtracting the values of a preceding vector embedding from a subsequent, adjacent vector embedding, forward playback (i.e., recreation of subsequent vector embeddings) can be performed by adding delta encoding values to the appropriate dimensional values of a starting vector embedding and reverse playback (i.e., recreation of preceding vector embeddings) can be performed by subtracting delta encoding values from the appropriate dimensional values of a starting vector embedding. In examples where delta encodings are created by subtracting values from preceding vector embeddings from a subsequent vector embedding, forward playback can be performed via subtraction and reverse playback can be performed via addition. Playback module 120 can be configured to recognize the format in which delta encoding values are stored (e.g., as a vector array, as position and difference values, etc.) and to modify appropriate dimensional values of the starting vector appropriately.

In examples where more than one delta encoding is applied to the starting vector embedding, each delta encoding can be applied sequentially and/or the delta encodings can be summed to create a "net delta" that can then be applied to the starting vector embedding. In examples where each delta encoding is applied sequentially, the delta encodings can optionally be applied in a time-wise order such that each intervening vector embedding (i.e., between the starting vector embedding and the target vector embedding) is at least temporarily created. In some of these examples, each intervening vector embedding can be stored for further use with subsequent steps of method 700.

Step 708 can be performed by creating new data for the target, decompressed vector embedding such that, following step 708, data exists for both the starting vector embedding and the target vector embedding. Additionally and/or alternatively, step 708 can be performed by modifying the existing data for the starting vector embedding (i.e., without creating a copy or otherwise creating new data) such that, following step 708, data only exists for the target vector embedding. For example, step 708 can be performed by modifying data for the starting vector embedding that is stored to vector database 150.

Steps 704-708 can be performed any number of times to decompress any suitable number of vector embeddings for any number of time-series data sets. In some examples, multiple iterations of steps 704-708 can be performed simultaneously, substantially simultaneously, or at least partially simultaneously to decompress multiple vector embeddings for multiple time-series data sets. In at least some examples, playback module 120 of server 100 can be configured to decompress all vector embeddings for any number of time-series data sets (including all available time-series data sets) within a time range by performing multiple iterations of steps 704-708.

Steps 710-714 are optional steps of method 700 and are performed in examples where it is desirable to store decompressed vector data to vector database 150 and/or in examples where it is desirable to perform queries of vector data.

In step 710, vector embedding data generated in steps 704-708 is stored to vector database 150. Method 700 can proceed to step 710 following step 708. The vector embedding data stored in step 710 can include all vector data decompressed during all preceding iterations of steps 704-708.

In step 712, server 100 and/or user device 190 receives a user query for querying vector data, including vector data decompressed in steps 704-708. The user query received in step 712 generally includes data of the same type as is represented by the vector embeddings to be searched. The user query can be any suitable type of data such as, for example, a text string, an image file, etc. User device 190 can receive the query in examples where one or more programs of user device 190 (e.g., of query module 140B) performs a query or search of vector data and server 100 can receive the query in examples where one or more programs of server 100 (e.g., of query module 140A) performs a query or search of vector data. Method 100 can proceed to step 712 from step 710 and/or from step 708 (i.e., in examples of method 700 including step 712 but lacking step 710). Step 712 is performed prior to step 714 in all examples, but optionally can be performed simultaneously or at substantially the same time as step 702, such that step 710 is performed before steps 704-708. For example, the request to decompress vector data and the user query can be sent as a single data transmission or set of data transmissions to server 100 from user device 190. In these examples, steps 714 is still performed following steps 704-708.

In step 714, query module 140A of server 100 and/or query module 140B of user device 190 performs a vector search based on the query received in step 712. The search can be performed by, for example, querying vector database 150 to identify similar vector embeddings (i.e., having a similarity score above a threshold value). The search can be only of vector embeddings decompressed in steps 704-708 and/or can be of the decompressed vector embedding(s) and the starting vector embedding(s) (i.e., such that the search is of all available vector embeddings). The population of vector embeddings searched can, in some examples, include less than all (i.e., only a subset) of the vector embeddings decompressed in steps 704-708. In some examples in which method 700 does not include step 710, vector embedding data created in steps 704-708 and, optionally, starting vector embedding data can be stored to memory 104 of server 100 and the vector data stored to memory 104 can be queried in step 714 according to the user query received in step 712.

Advantageously, method 700 enables decompression and, in some examples, storage and querying of vector embeddings based on a starting vector embedding and appropriate linking delta encodings. Notably, method 700 enables the decompression of any vector embedding and any number of vector embeddings representative of data files of a time-series data set from only a single vector embedding corresponding to a single time point in the time series.

Figure 8:
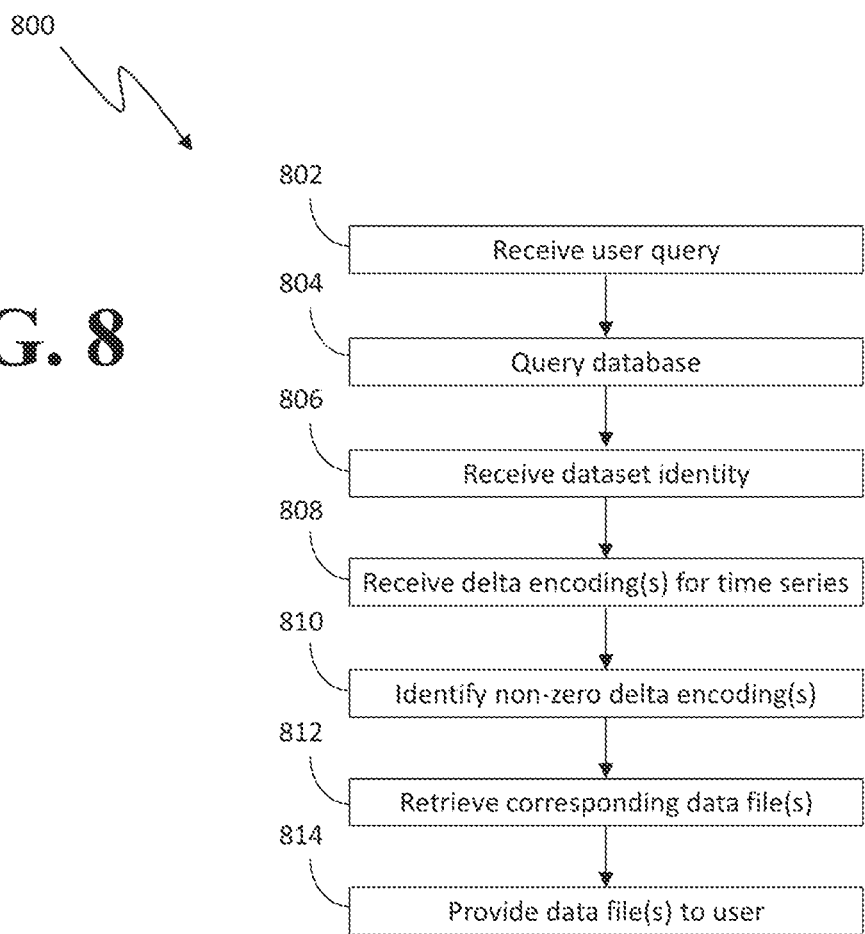
FIG. 8 is a flow diagram of an example of a method of identifying changes to time-series data sets using compressed vector embedding data.

FIG. 8 is a flow diagram of method 800, which is a method of identifying changes to time-series data using delta encodings. Method 800 includes steps 802-814 of receiving a user query (step 802), querying a database (step 804), receiving a data set identity in response to the query (step 806), receiving delta encoding(s) for a time series (step 808), identifying a non-zero delta encoding (or encodings) (step 810), retrieving corresponding data file(s) (step 812), and providing the data file(s) to the user. Method 800 is generally described herein with respect to system 10 (FIG. 1), but method 800 can be performed by system 200 (FIG. 2) or any other suitable system for using delta encodings to identify changes to time-series data.

In step 802, server 100 receives a user query to identify one or more time-series data set for which delta encodings exist. The delta encodings can be generated via, for example, method 600 (FIG. 6). The user query includes one or more query terms for querying the vector database in subsequent step 804. The query terms can, for example, specify one or more time-series data sets and/or can include one or more query terms for identifying and selecting a starting vector (i.e., a stored vector embedding) for a time-series data set. As described previously and particularly with respect to the discussion of query modules 140A, 140B (FIG. 1), it can be advantageous in some examples to represent one type of data via vector embeddings and to search and retrieve vector embeddings using a different type of data. In particular, it can be advantageous to search and retrieve vector embeddings representative of non-text data and/or data files of data file store 160 using a text string. As a specific example, it may be advantageous for analysis and other downstream searching tasks to encode image data as vector embeddings and to compress those vector embeddings, but to label those vector embeddings and/or the data files from which the vector embeddings and delta encoding information was derived with text descriptive of the encoded image. For example, a vector embedding for an image and/or the image can be labeled with text describing the location of the image, one or more objects represented in the image, etc. Other types of data can be labeled using text or any other suitable type of information and the aforementioned example is merely one illustrative embodiment.

In step 804, server 100 and/or user device 190 queries vector database 150 and/or data file store 160 (i.e., via query module 140A and/or query module 140B) to retrieve one or more database vectors and/or data files. In examples where the user query is an identity of one or more time-series data sets, server 100 can retrieve database vector(s) of vector database 150 belonging to or otherwise representative of data belonging to those time-series data set(s). In examples where the user query is of the same type of data as is represented by the vectors stored to vector database 150, query module 140A, 140B and/or vector database 150 can create a query vector that is an embedding of the user query, and perform a similarity search to identify one or more vectors having a similarity above a threshold value to the query vector. In examples where the vectors of vector database 150 and/or data files of data file store 160 are labeled with text information or another suitable type of data, any suitable searching algorithm or method can be used to retrieve one or more vectors or one or more data files for the purpose of identifying relevant time-series data sets. For example, if the vector embeddings and/or data files are labeled with text and the user query includes a text string, the text string can used as a basis for a query using any suitable text search algorithm, such as a string-matching algorithm, a keyword matching algorithm, etc. Steps 802 and 804 function together to allow a user to either directly choose or search for a time-series data set to use with subsequent steps of method 800.

In step 806, query module 140A of server 100 and/or query module 140B of user device 190 receives the identities of any data sets identified in step 804. The data set identity can be received by, for example, receiving (in response to the query in step 804) a data file belonging to the data set or a vector embedding representative of a data file belonging to the time-series data set. A data set identity can also be the object returned by the query performed in step 804. Any number of data sets can be identified via the query performed in step 804, such that any number of data set identities can be received in step 806. In at least some examples, only one data set identity is received in step 806.

In step 808, query module 140A of server 100 and/or query module 140B of user device 190 receives delta encoding(s) for each time series identified in step 806. Query module 140A and/or query module 140B can perform step 808 by querying delta encoding database 160 with the identifier(s) for the data set and/or one or more files retrieved in step 806. Server 100 and/or user device 190, respectively, can receive the delta encoding(s) for each time series in response to the query. Each time series for which delta encoding information is received in step 808 includes at least one delta encoding and, in at least some examples, at least some time-series data sets include a plurality of delta encodings.

In examples where the user query provided in step 802 identifies or otherwise specifies a range of time within which to search for changes to a time-series data set, query module 140A and/or query module 140B can be configured to retrieve delta encodings corresponding to time points falling within the time range (i.e., delta encodings describing differences between vector encodings that correspond to time points within the range). The delta encodings retrieved in step 808 can be generated according to method 600 (FIG. 6), as described previously.

In step 810, query module 140A of server 100 and/or query module 140B of user device 190 identifies one or more non-zero delta encodings of the delta encoding(s) retrieved in step 808. Non-zero delta encodings are delta encodings that have one or more non-zero values, thereby representing a change in at least a portion of the underlying data files (i.e., the files represented by the vector embeddings from which the non-zero encodings were derived). Accordingly, non-zero delta encodings identified in step 810 can be used by query module 140A of server 100 and/or query module 140B to identify time points at which data files of time-series data sets differ from data files for adjacent time points.

In examples where the delta encodings of delta encoding database 170 do not include zero values (e.g., where the delta encodings store position and difference values) and/or in examples where delta encodings are not created to represent differences between vector embeddings having the same or substantially similar (i.e., within a threshold) dimensional values, steps 808 and 810 can be performed at substantially the same time. That is, in these examples, as delta encodings are only created for adjacent vector embeddings having differing dimensional values, the retrieval in step 808 also functions to perform the identification in step 810.

In some examples, query module 140A and/or query module 140B can use a threshold value to identify delta encodings in step 810, such that only encodings where one or more difference values are above the threshold value are identified in step 810. In some of these examples, query module 140A and/or query module 140B can be configured such that only encodings having a threshold number of difference values above a threshold value are identified in step 810. The threshold(s) used can be user-configured, can be selected according to operational need, etc.

In step 812, query module 140A of server 100 and/or query module 140B retrieves data files corresponding to delta encodings identified in step 810. Query module 140A of server 100 and/or query module 140B can retrieve, for each delta encoding identified in step 812, the data file corresponding to either the later time point or the earlier time point of the adjacent time points. In some examples, whether query module 140A of server 100 and/or query module 140B retrieves data files for the later or earlier time points (i.e., of the adjacent time points corresponding to the delta encoding) can be determined based on user preference and/or according to the scheme in which vector embeddings are maintained. For example, if the vector embeddings searched in step 804 are representative of the most-recent data set, it may be advantageous to retrieve data files corresponding to earlier time points of adjacent time points. As an additional example, if the vector embeddings searched in step 804 are representative of a time point that sufficiently distant from the most-recent time point and/or of the earliest time point(s) in time-series data sets, it may be advantageous to retrieve data files corresponding to later time points of adjacent time points.

Query module 140A of server 100 and/or query module 140B can query or otherwise retrieve the data files from data file store 160. In step 812, query module 140A and/or query module 140B can also retrieve data files corresponding to vector embeddings identified in step 804 (i.e., the starting vector embeddings used for data set identification in relevant examples). In some examples, users can prefer to also be provided with the data file against which changes are being relatively determined, and also providing data files corresponding to the starting vector embeddings can be accordingly advantageous.

In step 814, query module 140A and/or query module 140B provides the data file(s) retrieved in step 812 to the user. In examples where query module 140A retrieves the data file(s) query module 140A can, for example, transmit the data file(s) (or an electronic representative thereof, such as one or more packets) to user device 190 via network 180, and user device 190 can provide the data file(s) to the user via user interface 196. In examples where query module 140B retrieves the data files, query module 140B provide data file(s) to the user via user interface 196.

Method 800 advantageously enables changes time-series data to be identified based on delta encoding information which, as described previously, is a compressed form of vector embedding data and requires less storage space than vector embedding data. Accordingly, method 800 provides a method of rapidly and automatedly identifying changes to time-series data that is sensitive to storage limitations and does not require the large storage volumes needed to store vector data or other embedded representations of data files.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of database operations, the method comprising:
receiving, by a processor, a user query;
generating, by the processor, a query vector embedding representative of the user query;
querying, by the processor, a vector database using the query vector embedding, wherein:
the vector database comprises a plurality of database vectors representative of a plurality of data files;
each database vector is representative of one data file of the plurality of data files,
each data file of the plurality of data files belongs to one time-series data set of a plurality of time-series data sets, and
each data file of the plurality of data files corresponds to a first time;
retrieving, by the processor, a first database vector of the plurality of database vectors based on the query, the first database vector representative of a first data file belonging to a first time-series data set of the plurality of time-series data sets;
receiving, by the processor, a first plurality of delta encodings describing differences between vector representations of temporally-adjacent data files of the first time-series data set;
identifying, by the processor and based on the first plurality of delta encodings, a second data file of the first time-series data set having a second vector representation that differs from the first database vector, the second data file corresponding to a second time; and
retrieving, by the processor, the second data file of the first time-series data set from a database.

2. The method of claim 1, wherein receiving the user query comprises receiving one or more first electronic signals representative of the user query from a user device, and further comprising transmitting one or more second electronic signals representative of the retrieved second data file to the user device.

3. The method of claim 2, and further comprising:
retrieving the first data file from the database; and
transmitting one or more third electronic signals representative of the retrieved first data file to the user device.

4. The method of claim 3, wherein identifying the second data file comprises identifying a delta encoding of the first plurality of delta encodings including at least one value greater than a threshold value.

5. The method of claim 3, and further comprising:
identifying, by the processor and based on the first plurality of delta encodings, a third data file of the first time-series data set having a third vector representation that differs from the first vector representation, the third data file corresponding to a third time; and
retrieving, by the processor, the third data file of the first time-series data set from a database.

6. The method of claim 5, and further comprising:
retrieving, by the processor, a fourth database vector of the plurality of database vectors based on the query, the fourth database vector representative of a fourth data file belonging to a second time-series data set of the plurality of time-series data sets;
receiving, by the processor, a second plurality of delta encodings describing differences between vector representations of temporally-adjacent data files of the second time-series data set;
identifying, by the processor and based on the second plurality of delta encodings, a fifth data file belonging to the second time-series data set and having a fifth vector representation that differs from the fourth database vector, the fifth data file corresponding to the second time; and
retrieving, by the processor, the fifth data file from the database.

7. The method of claim 6, and further comprising transmitting one or more fourth electronic signals representative of the retrieved fifth data file to the user device.

8. The method of claim 7, wherein the first time is before the second time.

9. The method of claim 8, wherein the third time is one of before the first time and after the second time.

10. The method of claim 7, wherein the second time is before the first time.

11. The method of claim 10, wherein the third time is one of after the first time and before the second time.

12. A system for performing database operations, the system comprising:
a vector database comprising a plurality of database vectors representative of a plurality of data files, wherein:
each database vector is representative of one data file of the plurality of data files,
each data file of the plurality of data files belongs to one time-series data set of a plurality of time-series data sets, and
each data file of the plurality of data files corresponds to a first time;
a file database organizing the plurality of data files;
a processor; and
at least one memory encoded with instructions that, when executed, cause the processor to:
receive a user query;
generate a query vector embedding representative of the user query;
query the vector database using the query vector embedding;
retrieve a first database vector of the plurality of database vectors based on the query, the first database vector representative of a first data file belonging to a first time-series data set of the plurality of time-series data sets;
receive a first plurality of delta encodings describing differences between vector representations of temporally-adjacent data files of the first time-series data set;
identify, based on the first plurality of delta encodings, a second data file of the first time-series data set having a second vector representation that differs from the first database vector, the second data file corresponding to a second time; and
retrieve the second data file of the first time-series data set from the file database.

13. The system of claim 12, wherein the instructions, when executed, cause the processor to receive the user query by receiving one or more first electronic signals representative of the user query from a user device, and wherein the instructions, when executed, further cause the processor to transmit one or more second electronic signals representative of the retrieved second data file to the user device.

14. The system of claim 13, wherein the instructions, when executed, further cause the processor to:
retrieve the first data file from the database; and transmit one or more third electronic signals representative of the retrieved first data file to the user device.

15. The system of claim 14, wherein the instructions, when executed, cause the processor to identify the second data file by identifying a delta encoding of the first plurality of delta encodings including at least one value greater than a threshold value.

16. The system of claim 14, wherein the instructions, when executed, further cause the processor to:
  identify, based on the first plurality of delta encodings, a third data file of the first time-series data set having a third vector representation that differs from the first vector representation, the third data file corresponding to a third time; and
  retrieve the third data file of the first time-series data set from a database.

17. The system of claim 16, wherein the instructions, when executed, further cause the processor to:
  retrieve a fourth database vector of the plurality of database vectors based on the query, the fourth database vector representative of a fourth data file belonging to a second time-series data set of the plurality of time-series data sets;
  receive a second plurality of delta encodings describing differences between vector representations of temporally-adjacent data files of the second time-series data set;
  identify a fifth data file belonging to the second time-series data set and having a fifth vector representation that differs from the fourth database vector, the fifth data file corresponding to the second time; and
  retrieve the fifth data file from the database.

18. The system of claim 17, and wherein the instructions, when executed, further cause the processor to transmit one or more fourth electronic signals representative of the retrieved fifth data file to the user device.

19. The system of claim 18, wherein the first time is before the second time.

20. The system of claim 19, wherein the third time is one of before the first time and after the second time.

* * * * *